United States Patent
Prakash

(10) Patent No.: US 7,257,238 B2
(45) Date of Patent: Aug. 14, 2007

(54) SYSTEM, APPARATUS, AND METHOD FOR IMAGE SCANNING QUALITY ADJUSTMENT

(75) Inventor: Ravinder Prakash, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 10/629,251

(22) Filed: Jul. 29, 2003

(65) Prior Publication Data

US 2005/0025375 A1 Feb. 3, 2005

(51) Int. Cl.
  *G06K 9/00* (2006.01)
  *G04K 9/40* (2006.01)
  *H04N 1/407* (2006.01)

(52) U.S. Cl. ............... 382/112; 382/254; 382/275; 358/3.26

(58) Field of Classification Search ............... 382/112, 382/266, 274–275, 309, 312, 254, 260, 305; 358/3.26, 3.27, 505
See application file for complete search history.

(56) References Cited

U.S. PATENT DOCUMENTS

| | | | |
|---|---|---|---|
| 4,933,538 A | 6/1990 | Heiman et al. | 235/462 |
| 5,229,591 A | 7/1993 | Heiman et al. | 235/472 |
| 5,250,791 A | 10/1993 | Heiman et al. | 235/472 |
| 5,396,053 A | 3/1995 | Swartz et al. | 235/462 |
| 5,438,424 A * | 8/1995 | Ozaki et al. | 386/114 |
| 5,692,065 A * | 11/1997 | Prakash et al. | 382/112 |
| 5,811,785 A | 9/1998 | Heiman et al. | 235/472 |
| 5,963,654 A | 10/1999 | Prakash et al. | 382/112 |
| 5,996,895 A | 12/1999 | Heiman et al. | 235/472.01 |
| 6,018,361 A * | 1/2000 | Fujii et al. | 348/180 |
| 6,478,225 B1 | 11/2002 | Swartz et al. | 235/462.22 |
| 6,727,489 B2 * | 4/2004 | Yano | 250/221 |
| 7,068,818 B2 * | 6/2006 | Nishio et al. | 382/112 |

\* cited by examiner

*Primary Examiner*—Kanjibhai Patel
(74) *Attorney, Agent, or Firm*—Kunzler & McKenzie

(57) ABSTRACT

An apparatus, system and process for automatically adjusting the quality of a scanned image includes a conversion module configured to produce a processed image matrix by modifying each value in a scanned image matrix using a table of values assigned to each element of the scanned image matrix. Also included is a measurement module configured to determine a quality of the processed image matrix and to store a quality history and a quality adjustment module configured to adjust the quality of the processed image matrix if the quality history shows a decrease in quality. Quality may be determined using average brightness, maximum brightness or some other quality parameter of the scanned image.

20 Claims, 6 Drawing Sheets

SYSTEM, APPARATUS, AND METHOD FOR IMAGE SCANNING QUALITY ADJUSTMENT

BACKGROUND OF THE INVENTION

1. Field of the Invention

This invention relates to the field of scanning images, and more particularly to automatically adjusting the quality of scanned images.

2. Description of the Related Art

Electronic scanning of images is becoming more prevalent as an increasing number of paper processes are converted to electronic processes and as devices such as printers, fax machines, scanners, and copiers are integrated into a single device. Point of sale scanning is becoming increasingly popular to scan checks, lottery tickets, etc. in order to reduce labor-intensive processes related to handling paper copies. Scanning technologies are also becoming less expensive, which in turn contributes to the growing popularity.

As users become increasingly dependent on scanning technology, the reliability of scanning technology for producing an accurate electronic copy of an image, defined here as a "scanned image," is critical. Near-zero maintenance for the life of a scanner is also highly desirable. In applications where scanners are used continually, such as point-of-sale (POS) applications, maintenance may disrupt the use of the scanners and is therefore undesirable.

FIG. 1 depicts one embodiment of a conventional scanning system 10. The illustrated scanner 10 includes a transport 12 where a document 14 to be scanned is placed. The transport 12 may be fixed or moving as the document 14 is scanned.

As the document 14 is scanned, an illumination source 16 projects light off the document 14 along a scan line 18. The emitted optical rays pass through an imaging lens 20 to an array of sensors 22, and are then converted to a digital signal using an analog to digital converter 24.

The digital signal is stored in a computer memory 26 in the form of a scanned image matrix 28, where each picture element, or "pixel," along a scan line represents a column of the scanned image matrix 28. As the document 14 is scanned, the transport 12 moves the image such that the scan line 18 moves and a segment of the scanned document 14 is scanned creating a new row in the scanned image matrix. Alternatively, the document 14 is fixed on the transport 12, and the scan line 18 moves across the document 14. This routine is continued until the entire document 14 is scanned and an entire scanned image matrix 28 is created.

The information in the scanned image matrix 28 may be processed by a CPU 30 to form a processed image matrix 32, which is also stored in the memory 26. In one embodiment, elements of the scanned image matrix 28 are compared to a table assigned to each pixel 34 to determine a corresponding element in the processed image matrix 32. The table assigned to each pixel 34 is used to compensate for differences from one sensor to the next in the array of sensors 22 or for other slight differences between pixels in the scanning process. Values in the tables that are assigned to each pixel 34 are set during a calibration process. The calibration process will be discussed below with regard to FIG. 4.

In general, the quality of scanned images can be monitored using control points within the scanning system or by monitoring the quality of the scanned image by analyzing the document 14 after it has been converted to an electronic form using the processed image matrix 32. Monitoring control points, such as low toner, paper jams, hardware failures, etc., within the scanning system are common and can determine failures of the hardware and software components. Unfortunately, analyzing control points cannot detect many problems such as accumulation of dust and debris, optical or electronic defocus, malfunctioning sensors for picture elements (pixels), and other hardware problems.

Periodic maintenance by a technician may be able to detect problems that are not detectable through simply monitoring control points. However, periodic maintenance requires the scanning system to be taken out of use during the maintenance. Furthermore, periodic maintenance requires a technician to physically travel to the site where the scanner is located, which may involve a greater cost than a consumer is willing to bear for an inexpensive scanner. In contrast, if periodic maintenance is not performed, accumulation of dust or other problems will cause the scanner to produce a darkened or otherwise unacceptable image.

As mentioned above, the second method of monitoring the quality of a scanned image is to analyze the document 14 after it has been converted to an electronic form using the processed image matrix 32. A process for analyzing the quality of a scanned image to identify unacceptable images is described in U.S. Pat. No. 5,963,654 issued to Prakash, et al. on Oct. 5, 1999. However, this patent only looks at scanned images on a case by case basis, does not involve the correction of scanned images, and does not track image quality history.

What is needed is a process, apparatus, and system that automatically correct the image quality of a scanned image. Beneficially, such a process, apparatus, and system would decrease the frequency of expensive periodic maintenance.

BRIEF SUMMARY OF THE INVENTION

The present invention has been developed in response to the present state of the art, and in particular, in response to the problems and needs in the art that have not yet been fully solved by currently available scanner technology diagnostics systems. Accordingly, the present invention has been developed to provide a process, apparatus, and system for automatically adjusting the quality of scanned images that overcome many or all of the above-discussed shortcomings in the art.

The apparatus for automatically adjusting the quality of a scanned image is provided with a logic unit containing a plurality of modules configured to functionally execute the necessary steps of producing a processed image matrix. These steps include modifying each value in a scanned image matrix using a table of values assigned to each element of the scanned image matrix, determining the quality of the processed image matrix, storing a quality history, and adjusting the quality of the processed image matrix if the quality history shows a decrease in quality. These modules in the described embodiments also preferably include a scanning module, a conversion module, a measurement module and a quality adjustment module. The measurement module is further comprises an average brightness module and a maximum brightness module. The quality adjustment module further comprises an average brightness adjustment module, a maximum brightness adjustment module, and a table adjustment module.

The scanning module is configured to produce a scanned image matrix. The conversion module is configured to produce a processed image matrix using a table assigned to each pixel. The measurement module is configured to measure image quality. The average brightness module is configured to determine a value of an average brightness variable. The maximum brightness module is configured to determine a value of a maximum brightness variable.

The quality adjustment module is configured to adjust the quality of the processed image matrix if the quality history shows a decrease in quality. The average brightness adjustment module is configured to use the value of the average brightness variable to change an average brightness history variable and to determine an amount to adjust brightness of the processed image matrix if a value of an average brightness history variable crosses an average brightness threshold. The maximum brightness adjustment module is configured to use the value of the maximum brightness variable to change a maximum brightness history variable and to determine an amount to adjust brightness of the processed image matrix if a value of a maximum brightness history variable crosses a maximum brightness threshold. The table adjustment module is configured to change an entry in the table of values assigned to each pixel.

The apparatus, in one embodiment, is configured to determine average brightness of a scanned image and use the average brightness to update a variable representing an average brightness history of previous scanned images using the average brightness module, compare the average brightness history variable to an average brightness threshold using the average brightness adjustment module, and to adjust the brightness of scanned images by adjusting elements of a table assigned to each pixel using the table adjustment module.

The apparatus is further configured, in one embodiment, to determine maximum brightness of a scanned image and use the maximum brightness to update a variable representing a maximum brightness history of previous scanned images using the maximum brightness module, compare the maximum brightness history variable to a maximum brightness threshold using the maximum brightness adjustment module, and to adjust the brightness of scanned images by adjusting elements of a table assigned to each pixel 34 using the table adjustment module.

A system of the present invention is also presented for automatically adjusting the quality of a scanned image. The system may be embodied by a scanner connected to a server and to computer workstations through a network. In particular, the system, in one embodiment, includes a scanner with a scanning module, a conversion module, a measurement module and a quality adjustment module.

A process of the present invention is also presented for automatically adjusting the quality of scanned images. The process in the disclosed embodiments substantially includes the steps necessary to carry out the functions presented above with respect to the operation of the described apparatus and system. In one embodiment, the process includes producing a processed image matrix by modifying each value in a scanned image matrix using a table of values assigned to pixel, determining the quality of the processed image matrix, and adjusting the quality of the processed image matrix if the quality of previous processed image matrices show a decrease in quality.

In a further embodiment, the process includes averaging the values the processed image matrix to determine an average brightness variable, comparing the average brightness variable to a present value of an average brightness history variable representing an average brightness of previous processed image matrices, decreasing the average brightness history variable by a small amount if the average brightness variable is less than a present value of the average brightness history variable, increasing the average brightness history variable by a large amount if the average brightness variable is greater than the present value of the average history brightness variable, and determining an amount to adjust brightness of the processed image matrix by changing an entry in the table of values assigned to each pixel if a value of an average brightness history variable crosses an average brightness threshold.

In a further embodiment, the process includes finding a maximum of the values the processed image matrix to determine a maximum brightness variable, comparing the maximum brightness variable to a present value of a maximum brightness history variable representing an average value of the maximum brightness of previous processed image matrices, decreasing the maximum brightness history variable by a small amount if the maximum brightness variable is less than the present value of the maximum brightness history variable, increasing the maximum brightness history variable by a large amount if the maximum brightness variable is greater than the present value of the maximum brightness history variable, and determining an amount to adjust brightness of the processed image matrix by changing an entry in the table of values assigned to each element of the processed image matrix if a value of a maximum brightness history variable crosses a maximum brightness threshold.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form can and organized within any suitable type of data structure. The operational data may be collected as a single data set, or may be distributed over different locations including over different storage devices, and may exist, at least partially, merely as electronic signals on a system or network.

Figure 1:
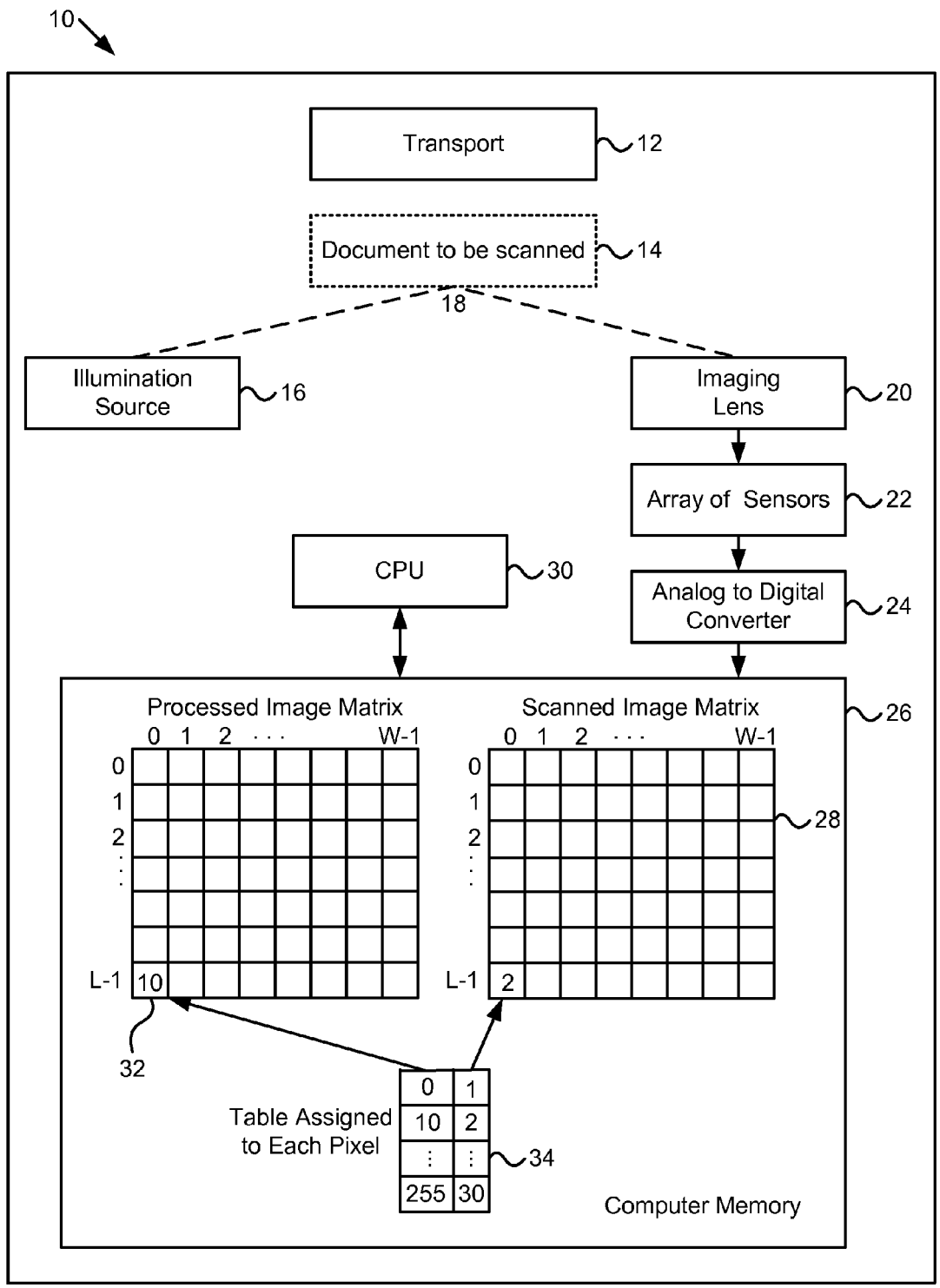
FIG. 1 is a schematic block diagram illustrating one embodiment of a conventional scanning device.
Figure 2:
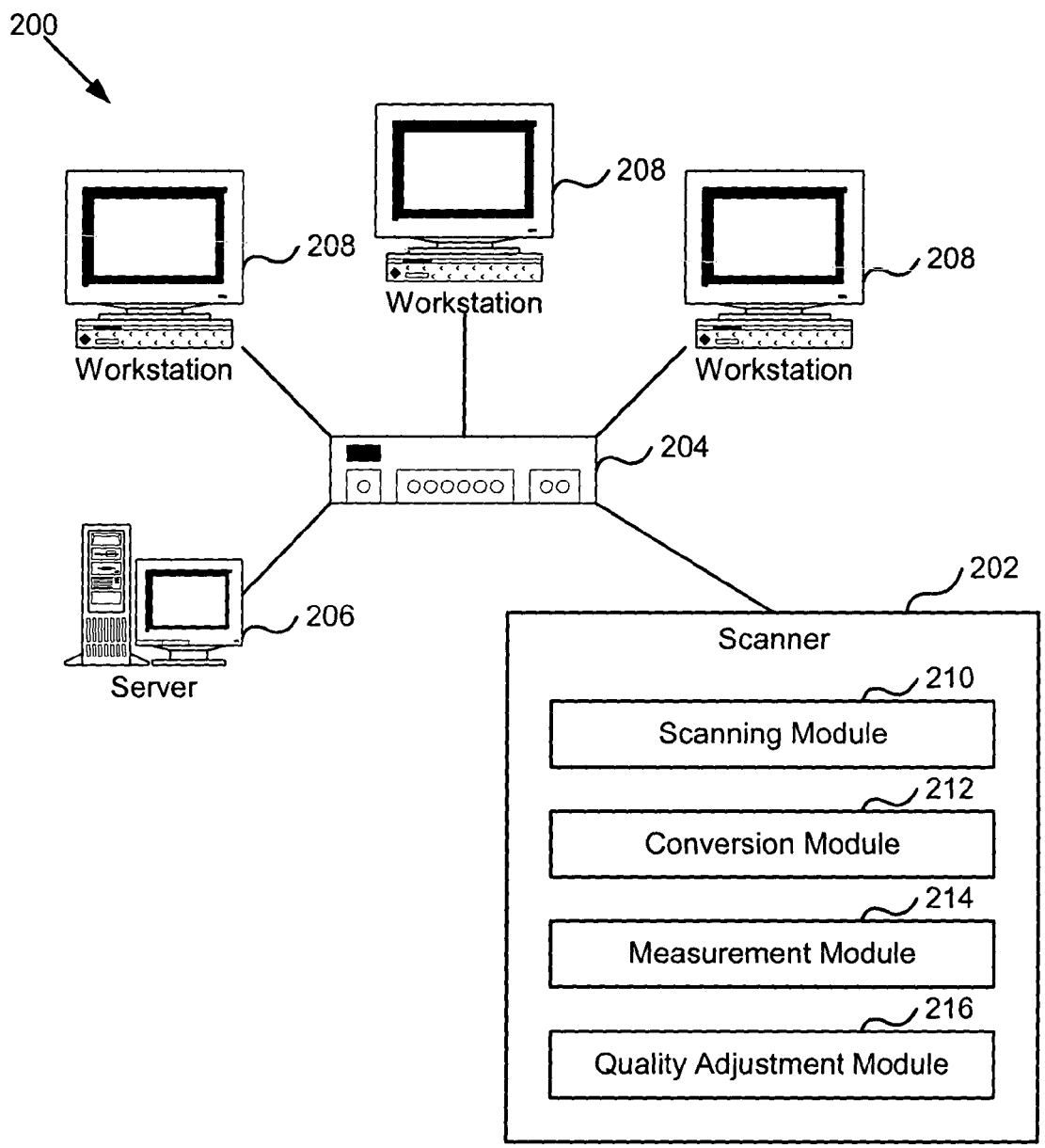
FIG. 2 is a system block diagram showing one embodiment a scanning system in accordance with the present invention.

FIG. 2 depicts one embodiment of a scanning system 200 of the present invention that includes a scanner 202 connected to a network 204. The network 204 may consist of a server 206 and other workstations 208 that are configured to control or transmit and receive information to and from the scanner 202. One embodiment of the scanner 202 includes a scanning module 210, a conversion module 212, a measurement module 214, and a quality adjustment module 216. One embodiment of the scanning module 210 is shown in FIG. 1 in which the output of the scanning module 210 is a scanned image matrix 28. One embodiment of the conversion module 212 is also shown in FIG. 1 in which the output of the conversion module 212 is a processed image matrix 212.

Figure 3:
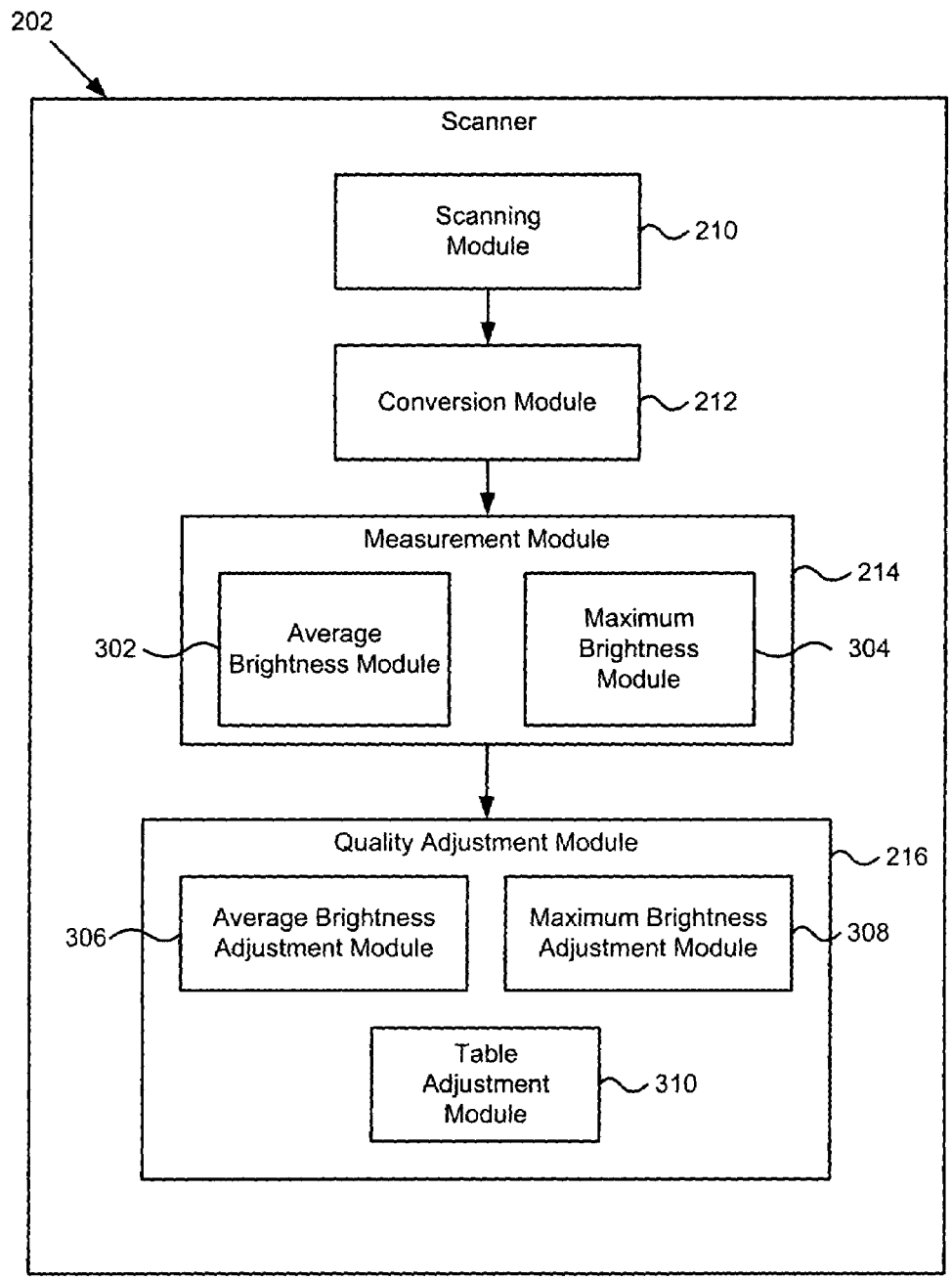
FIG. 3 is a schematic block diagram showing one embodiment of a scanning system in accordance with the present invention.

FIG. 3 is a more detailed depiction of a scanner 202 in accordance with the invention. This illustration of the scanner 202 includes one embodiment of the scanning module 210, configured to produce a scanned image matrix, a conversion module 212 that converts the scanned image matrix 28 to a processed image matrix 32, a measurement module 214 that generates a quality parameter variable, and a quality adjustment module 216 that adjusts quality of a scanned image.

The measurement module 214 uses the processed image matrix 32 to determine the quality of the scanned image. The quality of the scanned image is determined by evaluating image quality parameters such as average brightness, maximum brightness, contrast, video gradient or any combination of quality parameters.

In one embodiment, an average brightness module 302 within the measurement module 214 calculates an average brightness variable. In another embodiment, a maximum brightness module 304 within the measurement module 214 calculates a maximum brightness variable.

All scanners accumulate paper dust and other pollutants as they are used and over time. As the pollutants accumulate, the quality of the images being scanned is reduced. By tracking a quality parameter, adjustment to the processed image matrix compensates for the decrease in quality. Degradation of the quality parameter is tracked using a quality parameter history variable, and quality adjustments are made automatically to compensate for the adjustment in quality.

The quality adjustment module 216 is configured to track a quality parameter history and to adjust the quality of the processed image matrix 32 if the quality history shows a decrease in quality. The average brightness adjustment module 306 is configured to determine an amount to adjust the brightness of the processed image matrix 32 if a value of an average brightness history variable crosses an average brightness threshold. The maximum brightness adjustment module 308 is configured to determine an amount to adjust the brightness of the processed image matrix 32 if a value of a maximum brightness history variable crosses a maximum brightness threshold. The table adjustment module 310 is configured to change an entry in the table of values assigned to each pixel 34.

Figure 4:
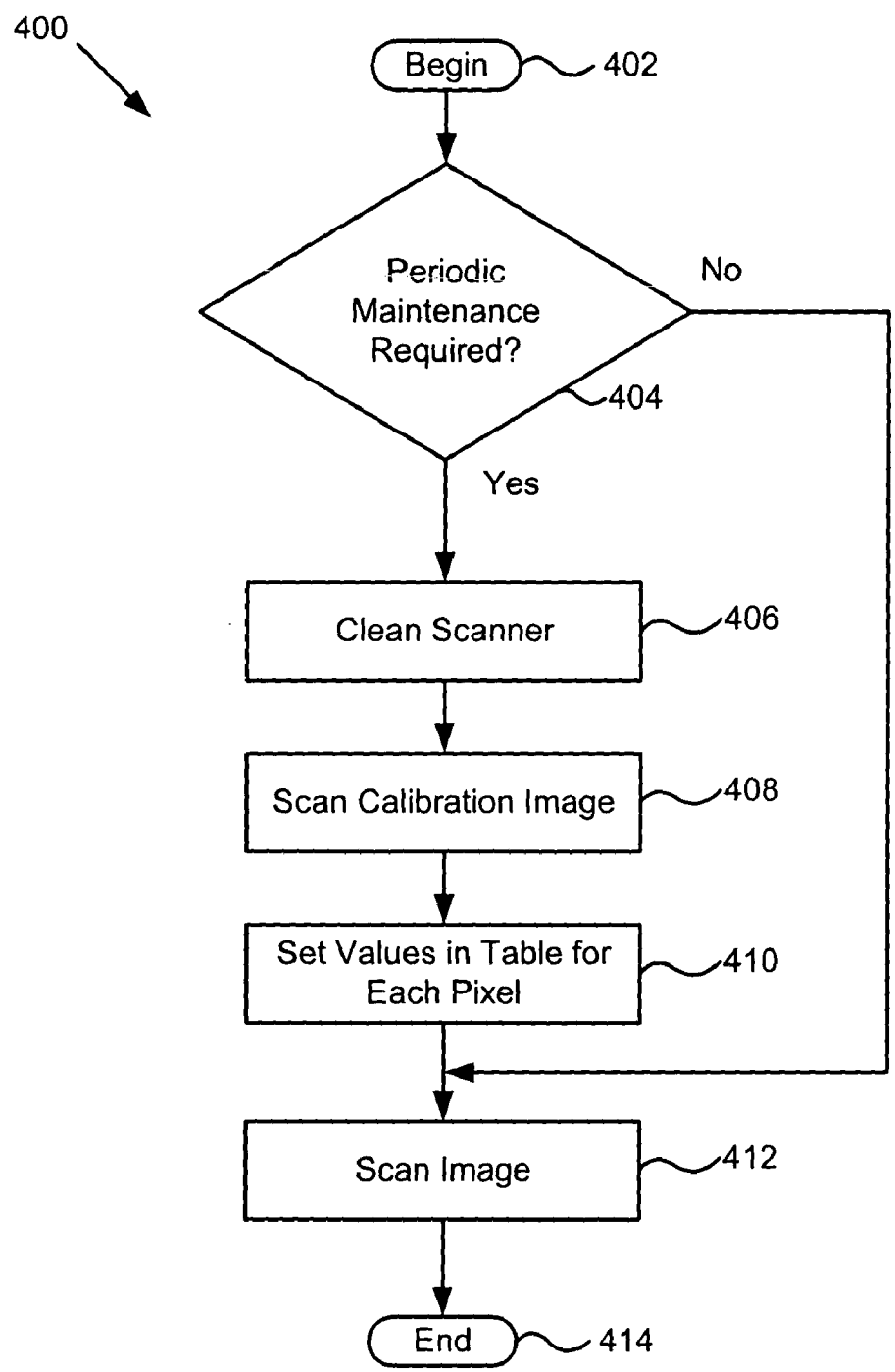
FIG. 4 is a schematic flow chart diagram illustrating a calibration process in accordance with the present invention.

FIG. 4 shows a process 400 for calibrating a scanning device that may be performed by the user or a technician. The process begins 402 by determining 404 if maintenance is required. If maintenance is required, then the scanner is cleaned 406, a calibration image is scanned 408, and the entries in the table of values for each pixel are set 410. A calibration image is an image of a specific color or brightness enabling a technician to scan the image and re-calibrate a scanner. If maintenance is not required or if the calibration process 400 is completed, then a document 14 is scanned 412 and the process is ended 414.

Figure 5A:
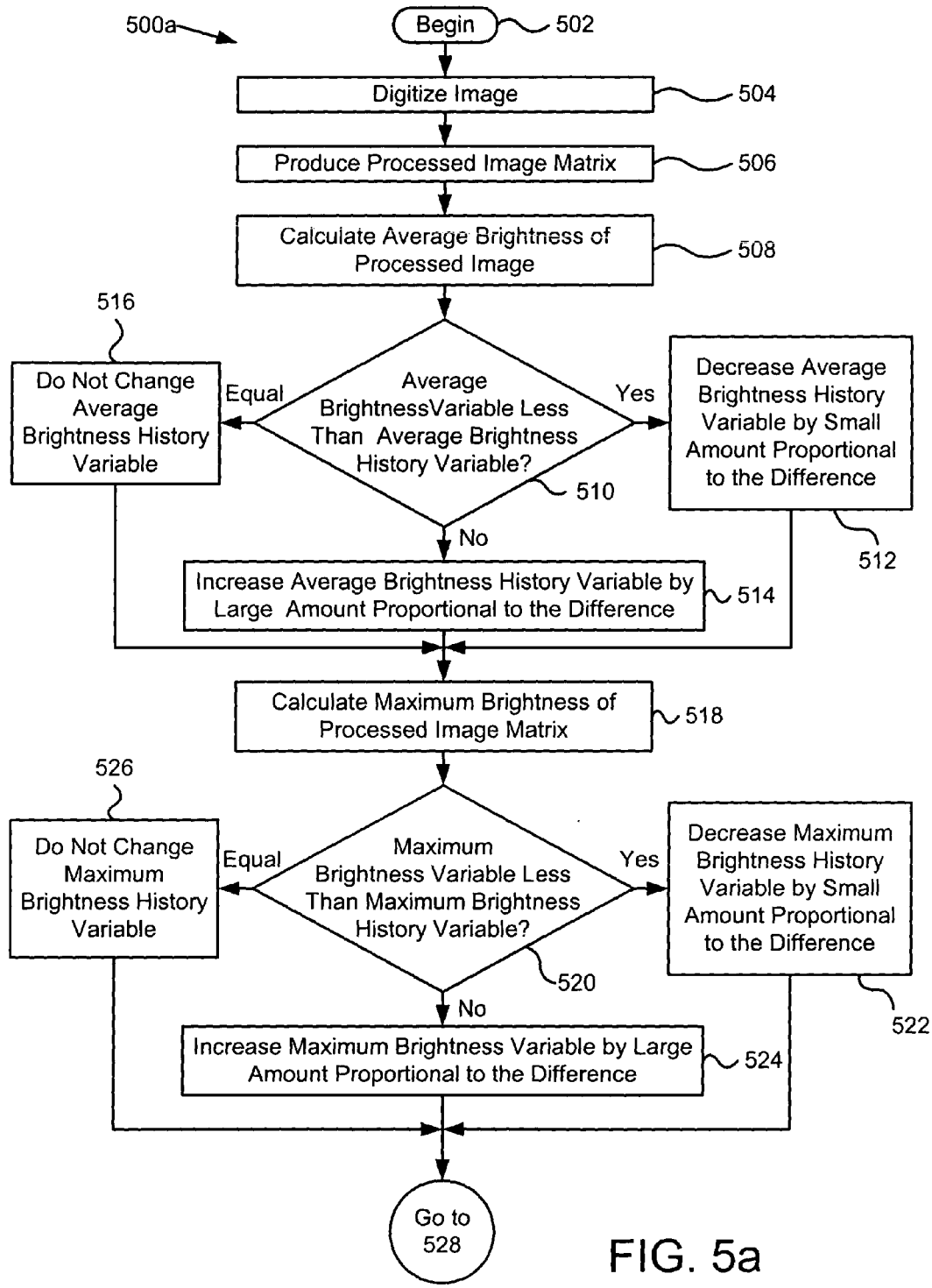
FIG. 5a is the first half of a schematic flow chart diagram illustrating one embodiment of a process to increase quality of a scanned image in accordance with the present invention.
Figure 5B:
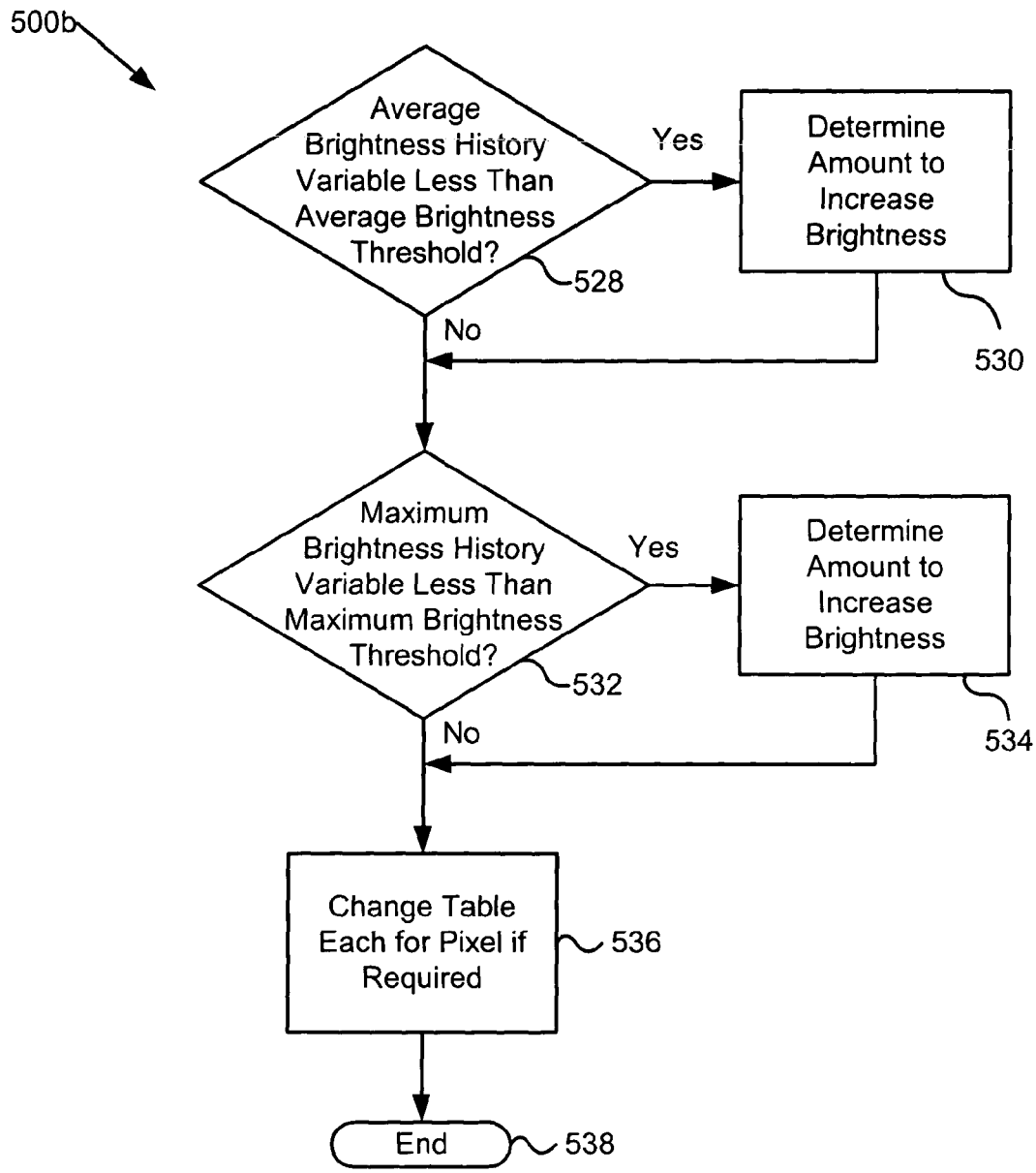
FIG. 5b is the second half of a schematic flow chart diagram illustrating one embodiment of a process to increase quality of a scanned image in accordance with the present invention.

FIGS. 5a and 5b show one embodiment of a process 500 for automatically adjusting quality of a scanned image. The process 500 begins 502 by digitizing 504 a scanned image to produce a scanned image matrix 28.

Next, the conversion module produces 506 a processed image matrix 32. The conversion from a scanned image matrix 28 to a processed image matrix 34 is well known to those skilled in the art and consists of comparing each element in the scanned image matrix 28 to a table assigned to each pixel 34 to produce a processed image matrix 32, and is illustrated in FIG. 1.

The table for each pixel 34 is preferably a look-up table that converts a digital number in the scanned image matrix 28 that represents a raw electronic signal such as a voltage, to a value that represents brightness of the document 14. In one embodiment of the table assigned to each pixel 34, the limits of the brightness values of the table 34 range from zero to 255, where zero corresponds to a minimum brightness and 255 corresponds to a maximum brightness. In a black and white scanning process, a table value of zero represents black and 255 represents white. The values in between represent a grayscale of varying brightness.

For color scanning, each pixel may have multiple tables, such as one for each color in the scanning process. For example, in an RGB format, three colors are represented: red, green, and blue. In this example, for tables representing the color red, values in the table may represent different hues of red. Other formats have different colors or parameters.

In one embodiment, the values in the table assigned to each pixel 34 are customized to adjust for differences in the scanning system for each pixel. One example of the differences between each pixel is the variation from one sensor to the next in the array of sensors 22. The values for the table assigned to each pixel 34 are determined using a calibration process further described in FIG. 4.

Once the scanned image matrix 28 is determined, the conversion module 212 produces 506 the processed image matrix 32. This is done by comparing each element in the scanned image matrix 28, which corresponds to a pixel, to the table of values assigned to the pixel 34. The raw value from the scanned image matrix 28 is then converted to a new value of brightness that has been adjusted based on the calibration process 400. The result is a processed image matrix 32 that has been corrected by the table of values assigned to each pixel 34.

The average brightness module 302 calculates 508 an average brightness using the processed image matrix 32. In one embodiment, the average brightness is calculated 508 by summing the elements in the processed image matrix 32, dividing the sum by the number of elements in the processed image matrix 32, and storing the value in an average brightness variable. The average brightness may also be determined by using a subset of the processed image matrix confined to those values in the matrix that represent the scanned document 14 and excluding elements in the matrix representing over-scanning portions of the transport 12.

Once the average brightness variable is determined, the average brightness module 302 then compares 510 the average brightness variable to an average brightness history. One embodiment of an average brightness history of processed image matrices 32 uses an average brightness history variable.

In one embodiment, the average brightness history variable is reset during the calibration process of the scanner 400 and then changes after every image is scanned. The amount that the average brightness history variable changes depends on the average brightness of the image being scanned.

In one embodiment, if the average brightness variable is less than the present value of the average brightness history variable, the average brightness history variable is decreased 512 by a small amount. For example, the average brightness history variable is in one embodiment decreased by an amount that is 99% of the present value of the average brightness history variable plus 1% of the average brightness variable. If the average brightness variable is greater than the present value of the average brightness history variable, the average brightness history variable is increased 514 by a large amount. Also by way of example, the average brightness history variable is preferably increased by an amount that is 90% of the present value of the average brightness history variable plus 10% of the average brightness variable. If the average brightness variable is equal to the average brightness history variable then the average brightness history variable is not changed 516.

This embodiment of adjusting the average brightness history allows tracking accumulation of dust and other pollutant and does not allow overcompensation for scanning of a large number of dark images. If a large number of dark images are scanned, the average brightness history variable is only adjusted down by a small amount. If at any time a bright image is scanned and registered in the processed image matrix, the bright image is sufficient evidence that the average brightness has not degraded due to dust and pollutants and, therefore, increasing the average brightness history variable by a large amount is justified.

Maximum brightness is treated in a manner similar to average brightness. In one embodiment, the maximum brightness module 304 calculates 518 the maximum brightness using the processed image matrix 32. Also in one embodiment, the maximum brightness is calculated by producing a histogram of the brightness values for each element in the processed image matrix. The brightness values are then grouped according to brightness and the value associated with the highest brightness determines the maximum brightness variable. A minimum size of a grouping is assigned in order to prevent individual pixels from erroneously registering a high brightness level due to noise. The minimum size of a grouping may be adjusted to overcome noise. In one embodiment, a group of four pixels at or near the same brightness and having the highest brightness of the processed image matrix 32 is used to determine the value of the maximum brightness variable.

The maximum brightness variable is compared 520 to a maximum brightness history variable. If the maximum brightness variable is less than the present value of the maximum brightness history variable, the maximum brightness history variable is decreased 522 by a small amount. For example, the maximum brightness history variable is in one embodiment decreased by an amount that is 99% of the present value of the maximum brightness history variable plus 1% of the maximum brightness variable. If the maximum brightness variable is greater than the present value of the maximum brightness history variable, the maximum brightness history variable is increased 524 by a large amount. For example, the maximum brightness history variable is in one embodiment increased by an amount that is 90% of the maximum brightness history variable plus 10% of the maximum brightness variable. If the maximum brightness variable is equal to the maximum brightness history variable then the maximum brightness history variable is not changed 526.

The average brightness adjustment module 306 compares 528 the average brightness history variable to an average brightness threshold. If the average brightness history variable falls below the average brightness threshold, the average brightness adjustment module 306 determines 530 an amount to change the processed image matrix. In one embodiment, the difference between the average brightness history variable and the average brightness threshold is scaled and converted to a percentage of brightness ranging from zero to 255.

The maximum brightness adjustment module 308 compares 532 the maximum brightness history variable to a maximum brightness threshold. If the maximum brightness history variable falls below the maximum brightness threshold, the maximum brightness adjustment module 308 determines 534 an amount to change the processed image matrix.

The table adjustment module 310 changes 536 the table assigned to each pixel 34 by an amount determined by the average adjustment module 306 and the maximum adjustment module 308. In one embodiment, the table adjustment module 310 adjusts the table assigned to each pixel 34 by comparing the results of the average brightness adjustment module 306 and the maximum brightness adjustment module 308 and using the greater amount of table adjustment. In another embodiment, rather than changing the table assigned to each pixel 34 for every change of the average brightness adjustment module 306 or maximum brightness adjustment module 308, the table adjustment module 310 includes a hysteresis band configured to increase or decrease the brightness of the scanned image by changing the table assigned to each pixel 34 only when the absolute value of the output of the average brightness adjustment module 306 or maximum brightness adjustment module 308 reach a specified limit.

In one embodiment, the table adjustment module 310 changes each value in each table assigned to each pixel 34. In another embodiment, the table adjustment module 310 replaces each table assigned to each pixel 34. The process ends 540.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for automatically adjusting the quality of a scanned image, the apparatus comprising:
    a conversion module configured to produce a processed image matrix by modifying each value in a scanned image matrix using a table of values assigned to each element of the scanned image matrix;
    a measurement module configured to determine a quality of the processed image matrix and to store a quality parameter in response to the determined quality and to track a quality history of the quality parameter of previously processed image matrices; and
    a quality adjustment module configured to adjust the quality of the processed image matrix if the quality history shows a decrease in quality.

2. The apparatus of claim 1, wherein the quality adjustment module further comprises a table adjustment module configured to change an entry in the table of values assigned to each pixel.

3. The apparatus of claim 1, wherein the quality parameter comprises an average brightness variable and the quality history comprises an average brightness history variable, and the measurement module further comprises an average brightness module configured to determine a value of the average brightness variable in response to the determined quality and to use the value of the average brightness variable to change the average brightness history variable.

4. The apparatus of claim 1, wherein the quality history comprises the average brightness history variable and the quality history comprises an average brightness history variable, and the measurement module further comprises an average brightness module configured to decrease the average brightness history variable by a small amount if the average brightness variable is lower than a present value of the average brightness history variable and to increase the average brightness variable by a large amount if the average brightness variable is higher than the present value of the average brightness history variable.

5. The apparatus of claim 1, wherein the quality parameter comprises a maximum brightness variable and the quality history comprises a maximum brightness history variable, and the measurement module further comprises a maximum brightness module configured to determine a value of the maximum brightness variable in response to the determined quality and to use the value of the maximum brightness variable to change the maximum brightness history variable.

6. The apparatus of claim 1, wherein the quality history comprises maximum brightness history variable and the quality history comprises a maximum brightness history variable, and the measurement module further comprises a maximum brightness module configured to decrease the maximum brightness history variable by a small amount if the maximum brightness variable is lower than a present value of the maximum brightness history variable and to increase the maximum brightness variable by a large amount if the maximum brightness variable is higher than the present value of the maximum brightness history variable.

7. The apparatus of claim 1, wherein the quality adjustment module further comprises an average brightness adjustment module configured to determine an amount to adjust brightness of the processed image matrix if a value of an average brightness history variable crosses an average brightness threshold and adjusting the quality of the processed image further comprises adjusting the brightness of the processed image matrix based on the determined amount.

8. The apparatus of claim 1, wherein the quality adjustment module further comprises a maximum brightness adjustment module configured to determine an amount to adjust brightness of the processed image matrix if a value of a maximum brightness history variable crosses a maximum brightness threshold and adjusting the quality of the processed image further comprises adjusting the brightness of the processed image matrix based on the determined amount.

9. The apparatus of claim 1, wherein the quality is determined using at least one quality parameter selected from the group consisting of an average brightness, a maximum brightness, a video gradient, and a contrast.

10. A system for automatically adjusting the quality of a scanned image, the system comprising:
    a scanner configured to scan images and produce the scanned image in a digital format wherein each pixel corresponds to an element in a scanned image matrix;
    a conversion module configured to produce a processed image matrix by modifying each value in the scanned image matrix using a table of values assigned to each element of the scanned image matrix;
    a measurement module configured to determine a quality of the processed image matrix and to generate an average brightness variable and a maximum brightness variable in response to the determined quality;
    an average brightness module configured to decrease an average brightness history variable by a small amount if the average brightness variable is lower than a present value of the average brightness history variable and to increase the average brightness variable by a large amount if the average brightness variable is higher than the present value of the average brightness history variable;
    a maximum brightness module configured to decrease an maximum brightness history variable by a small amount if the maximum brightness variable is lower than a present value of the maximum brightness history variable and to increase the maximum brightness variable by a large amount if the maximum brightness variable is higher than the present value of the maximum brightness history variable;
    an average brightness adjustment module configured to adjust brightness of the processed image matrix if a value of the average brightness history variable crosses an average brightness threshold; and
    a maximum brightness adjustment module configured to adjust brightness of the processed image matrix if a value of the maximum brightness variable crosses a maximum brightness threshold.

11. A process for automatically adjusting the quality of a scanned image, the process comprising:
    producing a processed image matrix by modifying each value in a scanned image matrix using a table of values assigned to each element of the scanned image matrix;
    determining the quality of the processed image matrix and storing a quality history of previously processed image matrices; and
    adjusting the quality of the processed image matrix if the quality history shows a decrease in quality.

12. The process of claim 11, wherein adjusting the quality of the processed image matrix comprises changing an entry in the table of values assigned to each pixel.

13. The process of claim 11 wherein determining the quality of a processed image matrix and storing a quality history of previously processed image matrices comprises:
- averaging values of the processed image matrix to determine an average brightness variable;
- comparing the average brightness variable to a present value of an average brightness history variable representing an average brightness of previous processed image matrices;
- decreasing the average brightness history variable by a small amount if the average brightness variable is less than a present value of the average brightness history variable; and
- increasing the average brightness history variable by a large amount if the average brightness variable is greater than the present value of the average history brightness variable.

14. The process of claim 11 wherein determining the quality of a processed image matrix and storing a quality history of previously processed image matrices comprises:
- finding a maximum of values of the processed image matrix to determine a maximum brightness variable;
- comparing the maximum brightness variable to a present value of a maximum brightness history variable representing an average value of a maximum brightness of previous processed image matrices;
- decreasing the maximum brightness history variable by a small amount if the maximum brightness variable is less than a present value of the maximum brightness history variable; and
- increasing the maximum brightness history variable by a large amount if the maximum brightness variable is greater than the present value of the maximum brightness history variable.

15. The process of claim 13, further comprising determining an amount to adjust brightness of the processed image matrix if a value of an average brightness history variable crosses an average brightness threshold and adjusting the quality of the processed image further comprises adjusting the brightness of the processed image matrix based on the determined amount.

16. The process of claim 14, further comprising determining an amount to adjust brightness of the processed image matrix if a value of a maximum brightness history variable crosses a maximum brightness threshold and adjusting the quality of the processed image further comprises adjusting the brightness of the processed image matrix based on the determined amount.

17. The process of claim 11, wherein the quality is determined using at least one quality parameter selected from the group consisting of an average brightness, a maximum brightness, a video gradient, and a contrast.

18. A process for automatically adjusts the quality of a scanned image, the process comprising:
- scanning an image to produce values in a scanned image matrix, each element in the scanned image matrix representing a pixel of the scanned image;
- producing a processed image matrix by modifying each value in the scanned image matrix using a table of values assigned to each element of the scanned image matrix;
- averaging values of the processed image matrix to determine an average brightness variable;
- comparing the average brightness variable to a present value of an average brightness history variable representing an average brightness of previous processed image matrices;
- decreasing the average brightness history variable by a small amount if the average brightness variable is less than a present value of the average brightness history variable;
- increasing the average brightness history variable by a large amount if the average brightness variable is greater than the present value of the average history brightness variable;
- determining an amount to adjust brightness of the processed image matrix if a value of an average brightness history variable crosses an average brightness threshold; and
- adjusting the brightness of the processed image matrix by changing an entry in the table of values assigned to each.

19. A computer readable storage medium comprising computer readable code configured to carry out a process for automatically adjusting the brightness of a scanned image, the process comprising:
- scanning an image to produce values in a scanned image matrix, each element in the scanned image matrix representing a pixel of the scanned image;
- producing a processed image matrix by modifying each value in the scanned image matrix using a table of values assigned to each element of the scanned image matrix;
- finding a maximum of values of the processed image matrix to determine a maximum brightness variable;
- comparing the maximum brightness variable to a present value of a maximum brightness history variable representing an average value of the maximum brightness of previous processed image matrices;
- decreasing the maximum brightness history variable by a small amount if the maximum brightness variable is less than the present value of the maximum brightness history variable;
- increasing the maximum brightness history variable by a large amount if the maximum brightness variable is greater than the present value of the maximum brightness history variable;
- determining an amount to adjust brightness of the processed image matrix if a value of the maximum brightness history variable crosses a maximum brightness threshold; and
- adjusting the brightness of the processed image matrix by changing an entry in the table of values assigned to each.

20. An apparatus for automatically adjusting the brightness of a scanned image, the apparatus comprising:
- means for producing a processed image matrix by modifying each value in a scanned image matrix using a table of values assigned to each element of the scanned image matrix;
- means for determining the quality of the processed image matrix and to store a quality parameter in response to the determined quality and to track a quality history of the quality parameter of previously processed image matrices; and
- means for adjusting the quality of the processed image matrix if the quality history shows a decrease in quality.

* * * * *